United States Patent [19]
Singhal et al.

[11] Patent Number: 5,433,400
[45] Date of Patent: Jul. 18, 1995

[54] AIRCRAFT DESIGN

[76] Inventors: Tara C. Singhal; Mukunda Singhal, both of P.O. Box 5075, Torrance, Calif. 90510

[21] Appl. No.: 21,213

[22] Filed: Feb. 23, 1993

Related U.S. Application Data

[63] Continuation-in-part of Ser. No. 798,529, Nov. 27, 1991, Pat. No. 5,236,150.

[51] Int. Cl.⁶ .................................................. B64C 3/00
[52] U.S. Cl. .............................. 244/12.1; 244/45 R; 244/38; 244/52; 244/12.5
[58] Field of Search ............... 244/118.1, 117 R, 119, 244/38, 45 R, 13, 12.1, 12.4, 12.5, 12.2, 51, 55, 52, 100 R, 102 R, 104 R, 104 FP, 104 CS, 104 L; 293/137, 135, DIG. 5

[56] References Cited

U.S. PATENT DOCUMENTS

| | | |
|---|---|---|
| 1,157,337 | 10/1915 | Stumpf . |
| 1,281,846 | 10/1918 | Salari ............................ 244/140 |
| 1,639,553 | 8/1927 | Broyles ......................... 244/13 |
| 1,686,991 | 10/1928 | Sehaumar et al. ............ 293/137 |
| 1,718,391 | 6/1929 | Teflow .......................... 244/38 |
| 1,777,698 | 10/1930 | Lofstraud .................... 244/103 R |
| 1,792,157 | 2/1931 | Franke ......................... 293/137 |
| 2,018,734 | 10/1935 | Molicki ........................ 244/45 R |
| 3,061,242 | 10/1962 | Zurawinski et al. ......... 244/52 |
| 3,260,482 | 7/1966 | Stroukoff ..................... 244/51 |
| 3,392,936 | 7/1968 | Wornom ...................... 244/13 |
| 3,837,600 | 9/1974 | Mason .......................... 244/12.1 |
| 3,847,368 | 11/1974 | Jakel, Jr. ...................... 244/13 |
| 4,709,879 | 12/1987 | Stefford ....................... 244/12.1 |

FOREIGN PATENT DOCUMENTS

| | | | |
|---|---|---|---|
| 1175936 | 4/1959 | France ......................... 244/12.1 |
| 1446830 | 6/1966 | France ......................... 244/12.1 |
| 2374208 | 8/1978 | France ......................... 244/219 |

*Primary Examiner*—Galen L. Barefoot

[57] ABSTRACT

An aircraft comprises a hollow elongated body having a plurality of short wings projecting outwardly form the body in a vertically stacked array. The wings transverse substantially the entire length of the body. Engines with diameters substantially equal to the maximum width of the wings are mounted behind the wings, with at least one engine mounted on either side of the aircraft. Honeycomb structures mounted behind each engine cause the air thrust rearward by the engines to be directed as a smooth laminar flow of air. Air deflectors mounted behind the honeycomb structures deflect the air thrust rearward by the engines. A steering mechanism can orient the deflectors: (i) in a downward direction to provide an upward lifting force on the aircraft, or (ii) in an upward direction to provide a downward force on the aircraft, or (iii) in a port or starboard direction to steer the aircraft. Landing gear is attached to the bottom of the aircraft. Resilient structures are used to absorb shock in case of a crash.

19 Claims, 6 Drawing Sheets

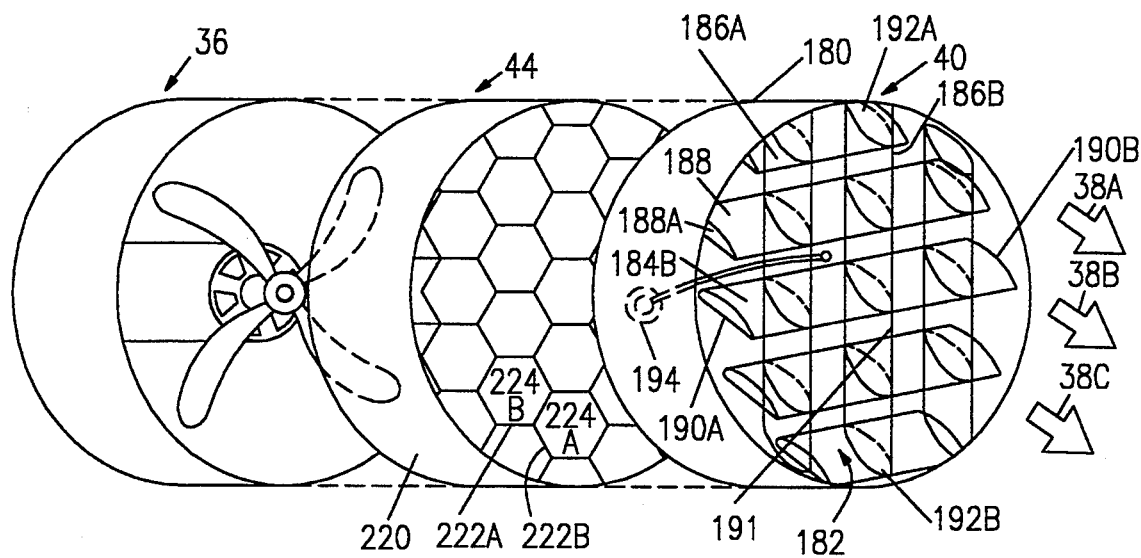
_fig. 8_
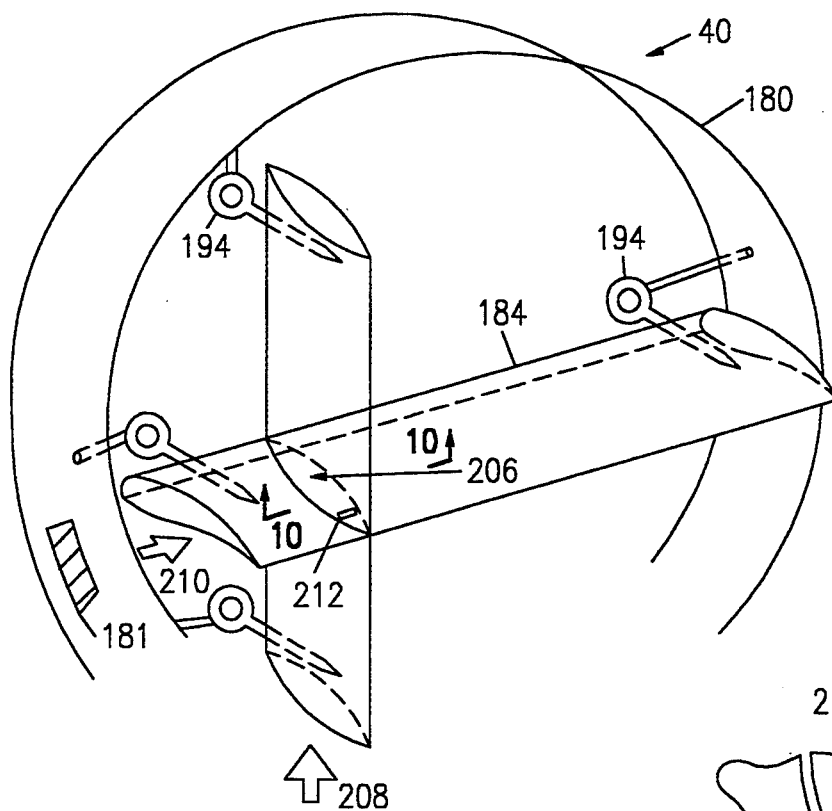
_fig. 9_
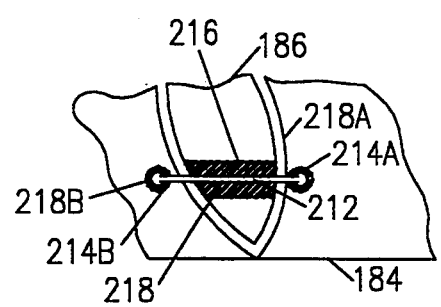
_fig. 10_

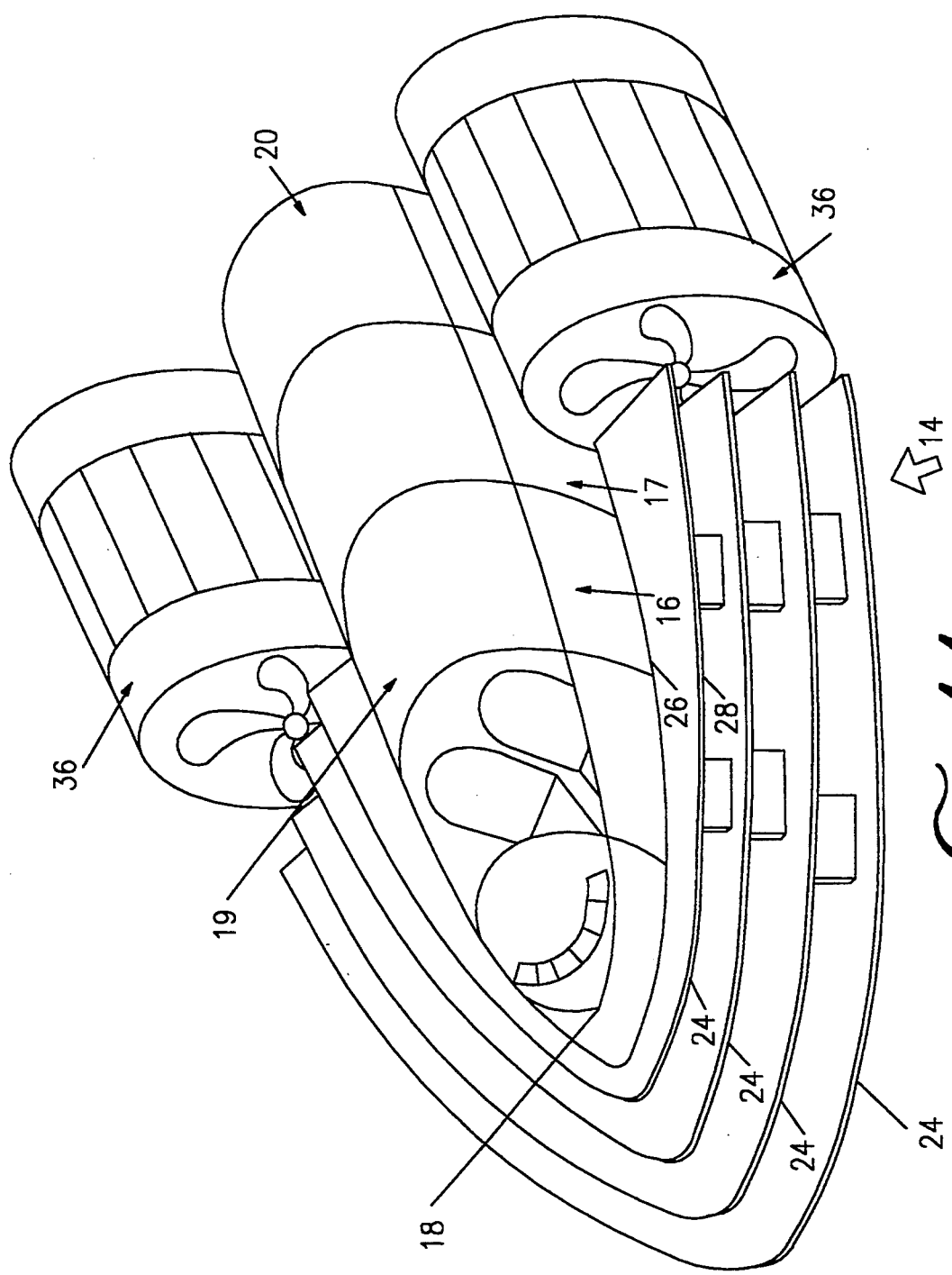

AIRCRAFT DESIGN

CROSS-REFERENCE

This application is a continuation-in-part of U.S. Patent Application Ser. No. 07/798,529, U.S. Pat. No. 5,236,150, filed on Nov. 27, 1991, by Tara Singhal, and entitled, "MODEL EXPERIMENTAL PLANE CRASH HARNESS," which is incorporated herein by this reference.

BACKGROUND

This invention relates to an aircraft design.

There are two principal types of aircraft designs. The first type, such as an airplane, has aerofoil-shaped wings extending outwardly from the sides of the aircraft to provide the lifting force necessary for the aircraft to fly. A second type of aircraft, such as helicopters, have vertically mounted aerofoil-shaped rotors that provide hovering capability.

When air flows past the surfaces of the aerofoil-shaped wings and rotors, a low pressure region forms above the aircraft thereby causing a lifting force on the aircraft which causes the aircraft to move upwardly into the low pressure region. The upward force is proportional to the area of the rotor or wing. The larger the area the higher the upward force. Consequently, airplanes and helicopters have elongated wings and rotors extending from the aircraft, in order to obtain strong lifting forces.

In many airplanes, the length of the elongated wings is often between 4 to 5 times the width of the body of the aircraft. Airplanes with elongated wings have several disadvantages. The large size of the wings necessitate runways with large widths for taking-off and landing the airplane. Runways with long lengths are also necessary because these aircraft must travel at high speeds in order to provide sufficient airflow over the wing surfaces for the aircraft to take-off. It is expensive to construct and maintain numerous long and wide runways within the confines of a city. Thus, it is impractical to use these aircraft to fly short commuting distances, such as for example, for commuting within a city, or between the city and the suburban areas.

Airplanes with wings are also difficult to fly at low speeds and/or low altitudes. High speeds are necessary to generate sufficient air flow across the wing surfaces to provide the necessary lifting force. Low altitude flying is precluded because of the high speeds required for flight.

Helicopters can land and take-off from a smaller runways than airplanes. However, they have other safety-related disadvantages, as discussed below. Aircraft which combine the characteristics of airplanes and helicopters, such as vertical take-off and landing (VTOL) aircraft can also land and take off from small runways. Although these aircraft are used by the military, they have limited commercial applications, because of their high cost.

Both airplanes and helicopters have significant safety-related disadvantages. Helicopters cannot glide to safety when the rotor engine stops malfunctions because helicopters lack wings. Thus, fatal accidents can result even while flying at low speeds or at low altitudes. Furthermore, engine failures in both airplanes and helicopters often result in fatalities and severe passenger injuries, because modern aircraft lack the ability to absorb the shock of even low impact crashes.

Thus, there is a need for aircraft with short wings that can take-off and land from small runways. There is also the need for aircraft which can fly at low speeds and at low altitudes. Finally, there is a need for safer aircrafts that can endure low impact collisions, without endangering its passengers or cargo.

SUMMARY

The aircraft of the present invention satisfies these needs. The aircraft has short wings; it can takeoff and land from small runways and at low speeds; it has the ability to cruise at low speeds and at low altitudes; and it endures low impact collisions without endangering its passengers.

The aircraft of the present invention comprises of a hollow elongated body having port, front, starboard, rear and bottom portions. A plurality of wings are attached to the body. Preferably, the width of the wings is no more than two times the width of the hollow body. The wings project outwardly from the body and each wing transverses substantially the entire length of the body and preferably the entire length of the port, front and starboard portions of the body. The wings are arranged substantial parallel to each other and attached to the body in a vertically stacked array.

Engines, preferably fan engines, the diameter of the engines being substantially equal to the maximum width of the wings, are mounted behind the wings, with at least one engine on either side of the aircraft. Air deflectors mounted behind the engines can deflect the air thrust rearward by the engines.

A honeycomb structure can also be mounted behind each engine to cause the air thrust rearward by 14 the engines to be directed as a smooth laminar flow of air. The honeycomb structure comprises a frame containing a plurality of parallel cylinders with cross-sections, the cylinders being joined to each other at their walls.

In preferred versions of the invention, shock-absorbing assemblies are mounted (i) between the vertically stacked wings so that the stacked wings can absorb shock without being crushed, (ii) within the wings, and (iii) within the landing gear of the aircraft. These arrangements of shock-absorbing structures allow the aircraft to withstand low impact forces without endangering its passengers or cargo.

These shock-absorbing assemblies essential comprise of an aerodynamic shaped flexible housing enclosing a first and second, mutually opposed, spaced apart, U-shaped channels arranged to conform to the shape of the housing. A plurality of resilient structures between the channels bend and absorb force like a spring. Preferably, each resilient structure has a head attached to the first channel, and a tail extending toward but not fixedly connected to the second channel. The shock-absorbing assemblies can further comprise sub-assemblies for maintaining the relative positions of the first and second channels during bending of the resilient structures by an impacting force.

Preferably, the landing gear comprises a base movably attached to the first end of a suspension containing the shock-absorbing assemblies described above. A mechanism for extending or retracting the suspension is attached to the base. A plurality of wheels are rotably mounted to the bottom of the suspension member.

Preferably, the deflectors mounted behind the engines comprise of a frame containing a grid of first and second vanes capable of deflecting air. The first vanes can be shaped in the form of an aerofoil to provide additional lift to the aircraft and the second vanes can be aerodynamically shaped to reduce airflow drag. Steering means are connected to the vanes so that the vanes can be oriented to deflect air in an upward, downward, port or starboard direction. Also, the vanes can be interconnected with connectors that transmit forces between the vanes, so that movement of a single vane in an upward, downward, port or starboard direction results in the simultaneous movement of all the vanes in the same direction.

DRAWINGS

These and other features, aspects and advantages of the present invention will become better understood with regard to the following description, appended claims, and accompanying drawings, where:

FIG. 8 is an exploded perspective view of an engine, honeycomb structure and deflector of the aircraft of FIG. 1;

FIG. 9 is a perspective view of a portion of a first and second vane attached to the frame of the deflector of FIG. 8.

FIG. 10 is a sectional view taken on Line 10—10 in FIG. 9, showing the connectors interconnecting the first and second vanes;

Figure 1:
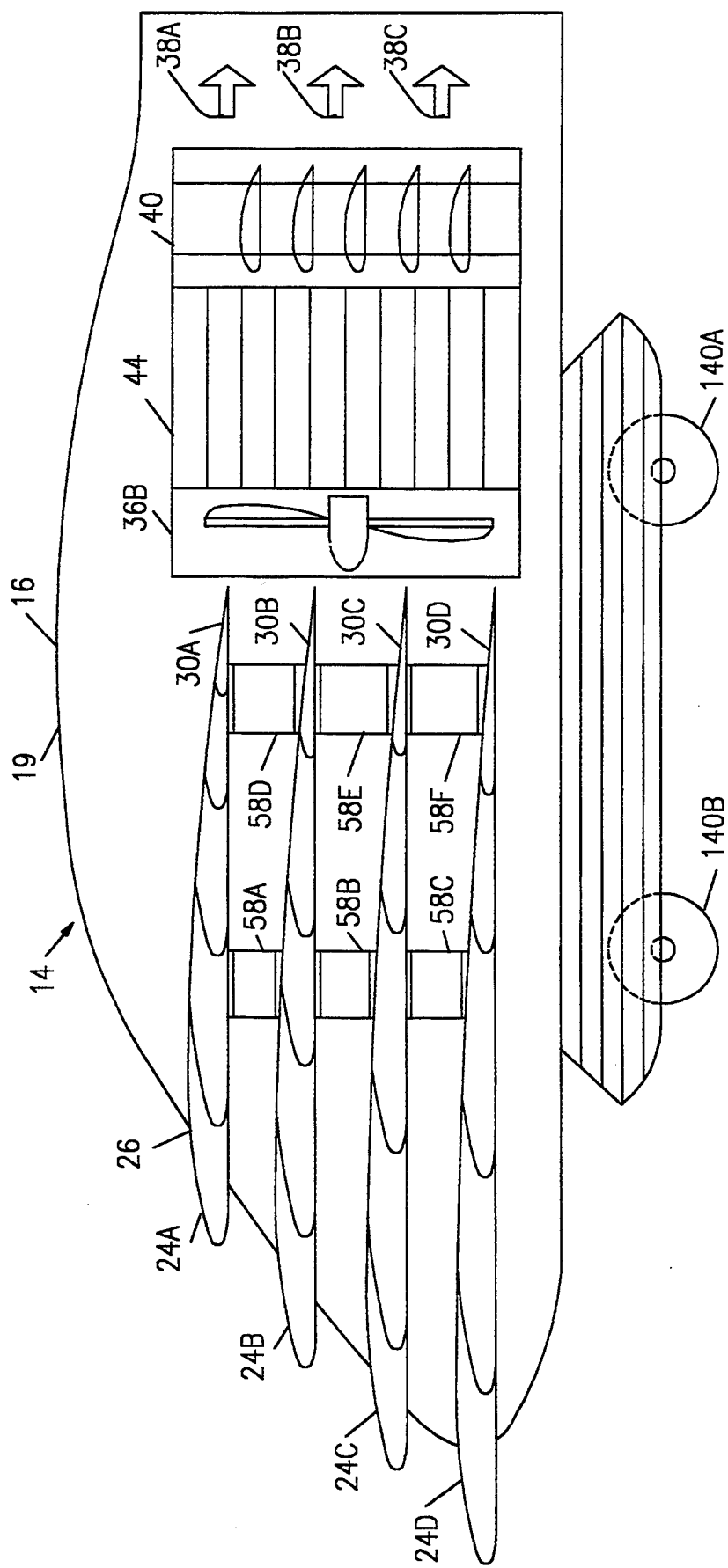
FIG. 1 is a side elevation view of a version of an aircraft according to the present invention, with the landing gear in the extended position.
Figure 2:
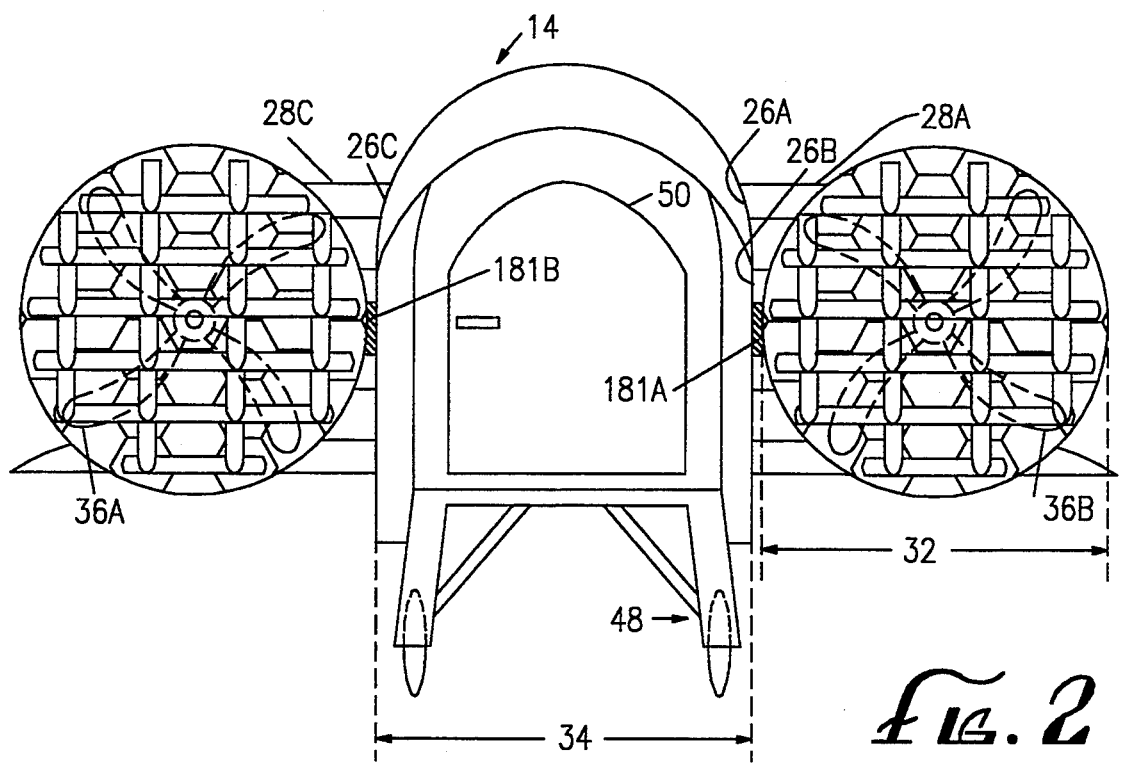
FIG. 2 is a rear elevation view of the aircraft of FIG. 1.
Figure 5:
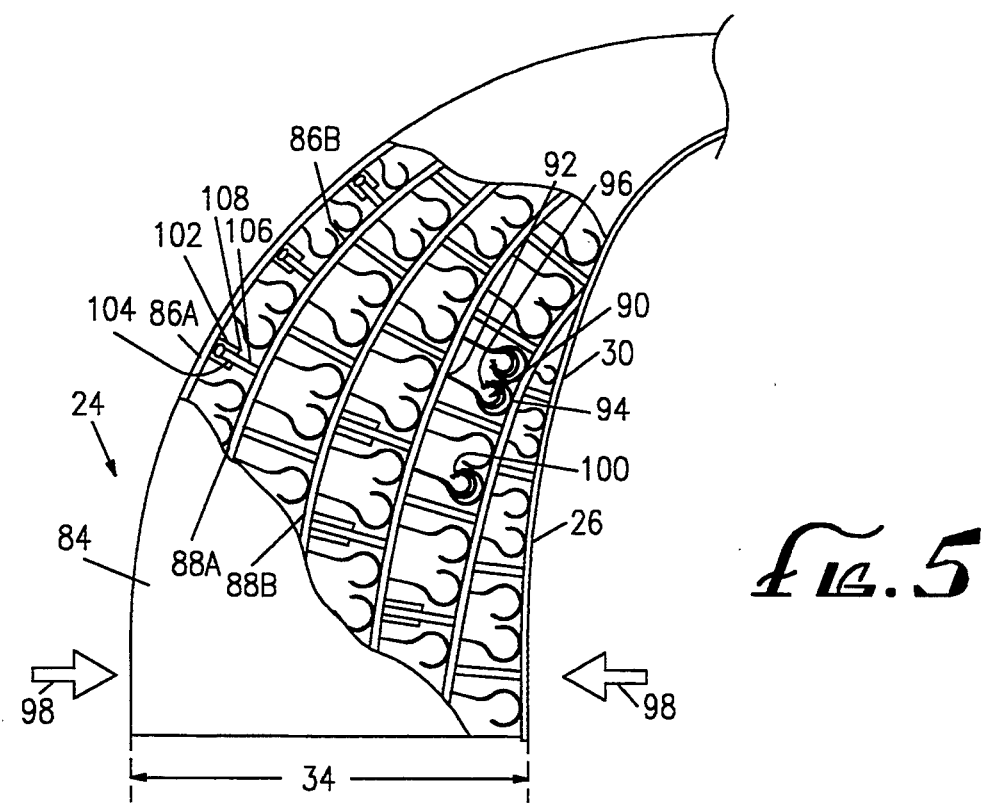
FIG. 5 is a top plan view, partially broken away, of a portion of a wing of the aircraft of FIG. 1 showing the shock-absorbing assemblies within the wing.

FIG. 11, a perspective view of a version of an aircraft according to the present invention.

DESCRIPTION

With reference to the figures, an aircraft of the present invention comprises a hollow elongated body 16 having a port (left) portion 17, a front portion 18, a starboard (right) portion 19, a rear portion 20, and a bottom portion 21. A plurality of wings 24 are attached at their inward edges 26 to the hollow body 16, with the outward edges 28 of the wings 24 projecting outwardly from the body 26 and the rear portions 30 of the wings 24 extending toward the rear portion 20 of the body 16. The wings 24 are substantially parallel to each other and are arranged in a vertical stack. Each wing traverses substantially the entire length of the body 16 and preferably the entire length of the port portion 17, the forward portion 18, and the starboard portion 19 of the body 16.

Preferably, the maximum width 32 of the wings 24 does not exceed two times the maximum width 34 of the body 16. The relatively short wingspan of the wings 24 allows the aircraft 14 to takeoff from and land on runways with small widths. It is also preferred that the rearward portions 30 of the wings 24 have a sinusoidal shape.

A plurality of engines 36 are attached behind the wings 24 and toward the rear portion 20 of the body 16. The engines 36 propel the aircraft 14 by thrusting air towards the rear of the aircraft (as depicted by the arrows 38). Deflectors 40 are mounted behind the engines 36. A steering mechanism 42 can be used to adjust the orientation of the deflectors 40. In a preferred version of the invention, honeycomb structures 44 are mounted between the engines 36 and the deflectors 40. Preferably, the engines 36, the deflectors 40, and the honeycomb structures 44 all have a diameter substantially equal to the maximum width of the wings 32. Landing gear 48 is attached to the bottom portion 20 of the body 16.

The interior of the aircraft can be accessed through a door 50 at the rear portion 20 of the hollow body 16. The interior of the body 16 can contain a plurality of seats 52 and/or empty space for carrying cargo.

In a preferred version of the invention, a plurality of shock-absorbing assemblies 58 are mounted between the vertically stacked wings 24 so that the stacked wings 24 can absorb shock without being crushed. The shock-absorbing assemblies 58 are mounted substantially perpendicular to the surfaces of wings 24 and extend along the length of the body 16 of the aircraft 14. For example, assembly 58a is mounted between the wings 24a and 24b, and assembly 58b is mounted directly below assembly 58a, as shown in FIG. 1.

Figure 4:
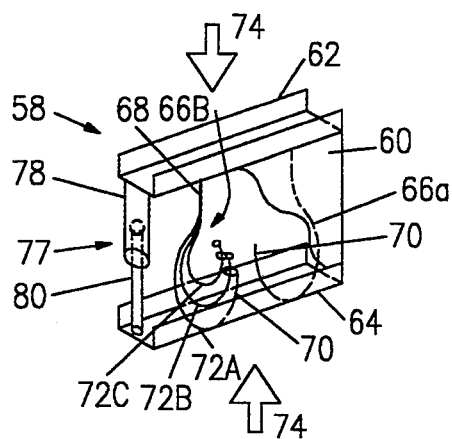
FIG. 4 is a front perspective view, partially broken away, of a shock-absorbing assembly, showing resilient structures and sub-assemblies for maintaining the position of the channels.
Figure 6:
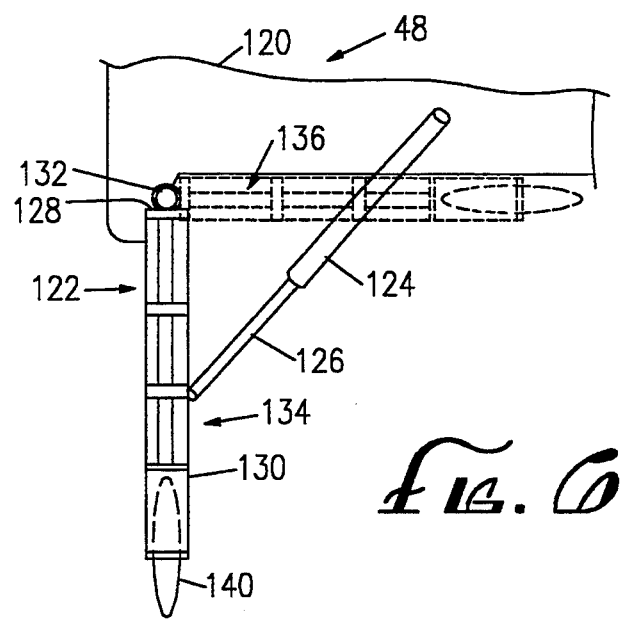
FIG. 6 is a front elevation view of the landing gear in its extended position.
Figure 7:
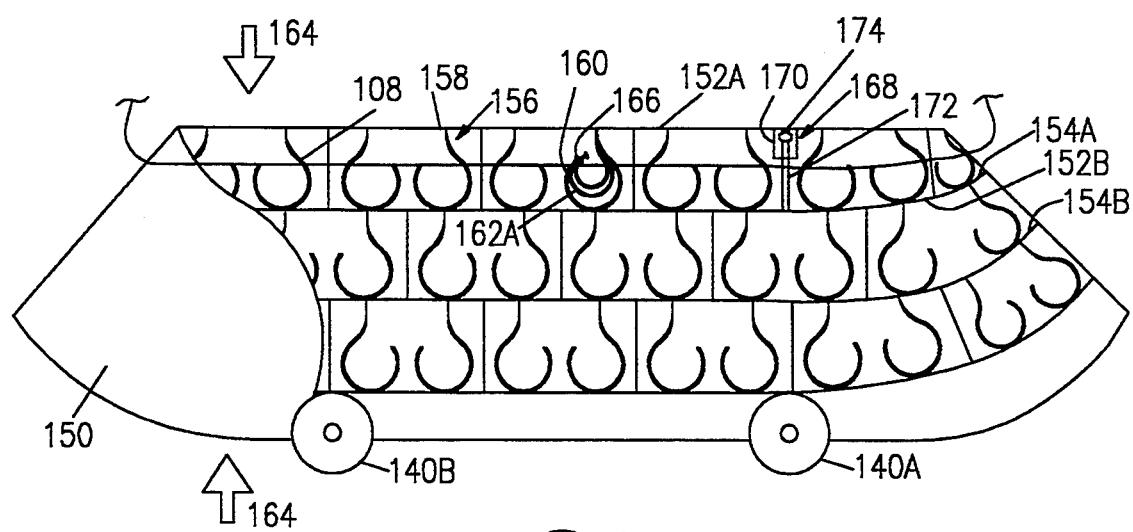
FIG. 7 is a side elevation view, partially broken away, of the landing gear of FIG. 6, showing the arrangement of shock-absorbing assemblies within the landing gear.

With reference to FIG. 4, the shock-absorbing assembly 58, comprises a flexible housing 60 enclosing a first channel 62 and a second channel 64, the two channels being U-shaped, rigid, spaced apart and mutually opposed. Resilient structures 66 have a head 68 anchored to the first channel 62, and a tail 70 extending towards but not fixedly connected to the second channel 64. The tail 70 has a single or multiple curved portions 72 sufficiently resilient that when the curved portions 72 are forced against the second channel 64 by a force (the arrows 74 show the direction of the force) the curved portions 72 bend like a spring and absorb the force and then return back to their normal position. When there are multiple curved portions 72, the curved portions 72 are inter-connected by a plurality of rings 76, so that as the force increases, the number of curved portions 72 that bend and absorb the force also increases.

The shock-absorbing assembly 58 also contains a plurality of sub-assemblies 77 which maintain the relative positions of the first channel 62 and the second channel 64 during bending of the curved portions 72. Each sub-assembly 77 comprises a cylinder 78 anchored to a channel 62 and having an open end 79 with an inwardly extending lip 80, the open end 79 projecting toward the other channel 64. A rod 81 is anchored to the second channel 64, with at least a portion 82 of the rod 81 sized to fit into open end 79 of the cylinder 78 and bearing a restrictor 83 sized larger than the open end 79 of the cylinder 78 to prevent the portion 82 of the rod 81 from exiting from the cylinder 78. At least a portion of the rod 81 extends into the open end 79 of the cylinder 78, so that application of a force (the arrows 74 show the direction of the force) on the first channel 62 and the second channel 64 pushes the rod 81 further into the open end 79 of the cylinder 78. When the force is released, the rod 81 returns to its original position.

Preferably, the wings 24 have shock-absorbing ability, and comprise an aerofoil-shaped, flexible housing 84 having an inward edge 26 attached to the body 16 of the aircraft and an outward edge 28 extending outwardly from the body 16. The housing 84 encloses a plurality of U-shaped, first channels 86 and second channels 88, the channels arranged within the wings 24 to conform to the shape of the flexible housing 84. Resilient structures 90 have a head 92 anchored to the first channel 86, and a tail 94 extending towards but not fixedly connected to the second channel 88. The tail 94 has a single or multiple curved portions 96 sufficiently resilient that when the curved portions 96 are forced against the second channel 88 by the force 98, the curved portions 96 bend like a spring and absorb the force 98 and then return back to their normal position. When there are multiple curved portions 96, the curved portions 96 are interconnected by a plurality of rings 100, so that as the force 98 increases, the number of curved portions 96 that bend and absorb the force also increases.

The shock-absorbing assembly also contains a plurality of sub-assemblies 102 which maintain the relative positions of the first channel 86 and the second channel 88 during bending of the resilient structures by the force 98 and afterward during release of the force 98. Each sub-assembly 102 comprises a cylinder anchored to a channel 86 and having an open end 105 with an inwardly extending lip 106, the open end projecting toward the other channel 88. A rod 107 is anchored to the second channel 88, with at least a portion 108 of the rod 107 sized to fit into open end 105 of the cylinder 104 and bearing a restrictor 109 sized larger than the open end 105 of the cylinder 104 to prevent the portion 108 of the rod 107 from exiting from the cylinder 88. At least a portion of the rod extends into the open end 105 of the cylinder 104, so that application of a force (the arrows 98 show the direction of the force) on the first channel 86 or the second channel 88 pushes the rod 107 further into the open end 105 of the cylinder 104. When the force is released, the rod 107 returns to its original position.

Preferably, the landing gear 48 comprise a base 120, a suspension 122, and a mechanism 124 for extending and retracting the suspension 122, such as for example a hydraulic cylinder-piston mechanism 126, is attached to the base 120. In the extended position 134, the landing gear 48 is substantially perpendicular to the base 120, and in the retracted position 136, the suspension 122 lies substantially parallel to the base 120. The suspension 122 has a first end 128 and a second end 130. The first end 128 is movably attached to the base 120 at the hinge 132. A plurality of wheels 140 are rotably mounted to the second end 130 of the suspension 122.

Preferably, the suspension 122 comprises an aerodynamic-shaped, flexible housing 150 enclosing a plurality of U-shaped first channels 152 and second channels 154 arranged to conform to the shape of the housing 150. Resilient structures 156 have a head 158 anchored to the first channel 152, and a tail 160 extending towards but not fixedly connected to the second channel 154. The tail 160 has a single or multiple curved portions 162 sufficiently resilient that when the curved portions 162 are forced against the second channel 154 by the force 164, the curved portions 162 bend like a spring and absorb the force 164 and then return back to their normal position. When there are multiple curved portions 162, the curved portions 162 are inter-connected by a plurality of rings 166, so that as the force 164 increases, the number of curved portions 162 that bend and absorb the force also increases.

The shock-absorbing assembly also contains a plurality of sub-assemblies 168 which maintain the relative positions of the first channel 152 and the second channel 154 during bending of the resilient structures 156 by the force 164 and afterward during release of the force 164. Each sub-assembly 168 comprises a cylinder 170 anchored to a channel 152 and having an open end 171 with an inwardly extending lip 172, the open end 171 projecting toward the other channel 154. A rod 173 is anchored to the second channel 154, with at least a portion 174 of the rod 173 sized to fit into open end 171 of the cylinder 170 and bearing a restrictor 175 sized larger than the open end 171 of the cylinder 170 to prevent the portion 174 of the rod 173 from exiting from the cylinder 170. At least a portion of the rod 173 extends into the open end 171 of the cylinder 170, so that application of the force 164 on the first channel 152 or the second channel 154 pushes the rod 173 further into the open end 171 of the cylinder 170. When the force 164 is released, the rod 172 returns to its original position.

Preferably, the engines 36 are fan engines mounted behind the wings 24 and to the rear of the body 16. Preferably, a first engine 36a is mounted on the port portion 17 of the body 16, and a second fan engine 36b is mounted on the right portion 19 of the body 16. It is believed that mounting of the engines 36 directly behind the wings 24 increases the speed of the airflow 38 over the wings 24. and that sizing the diameter of the engines 36 to correspond to the maximum width 32 of the wings 24, increases the amount of airflow 38 across the surface of the wings 24, thereby maximizing the lifting force on the aircraft 14 and allowing use of wings with small widths 32.

Deflectors 40 are mounted on the hollow body 16, to the rear of the engines 36, to deflect the air flow 38 thrust rearward by the engines 36 in: (i) a downward direction to provide an additional upward lifting force on the aircraft 14, (ii) an upward direction to provide a downward force of the aircraft 14 or (iii) a port or starboard direction to steer the aircraft 14 leftward or rightward. It is believed that use of the deflectors 40 increase the lifting force on the aircraft 14 allowing take-off from short runways and allowing low speed/low altitude flights.

Each deflector 40 comprises a frame 180 mounted on the aircraft by the mounting 181. The frame 180 encloses a grid 182 of first vanes 184 and second vanes 186, the first vanes 184 and the second vanes 186 being capable of deflecting the air flow 38. The first vanes 184 have a body 188 and two mutually opposed end portions 190, and the second vanes 186 also have a body 191 and two mutually opposed end portions 192. The body 188 of each of the first vanes 184 has plurality of spaced-apart openings 193, the openings 193 being sized to fit the second vanes 186. The second vanes 186 are arranged substantially perpendicular to the first vanes 184 with the body 191 of each second vane 186 fitting into the openings 193 of the first vanes 184, thereby forming the grid 182 of first vanes 184 and second vanes 186.

Figure 3:
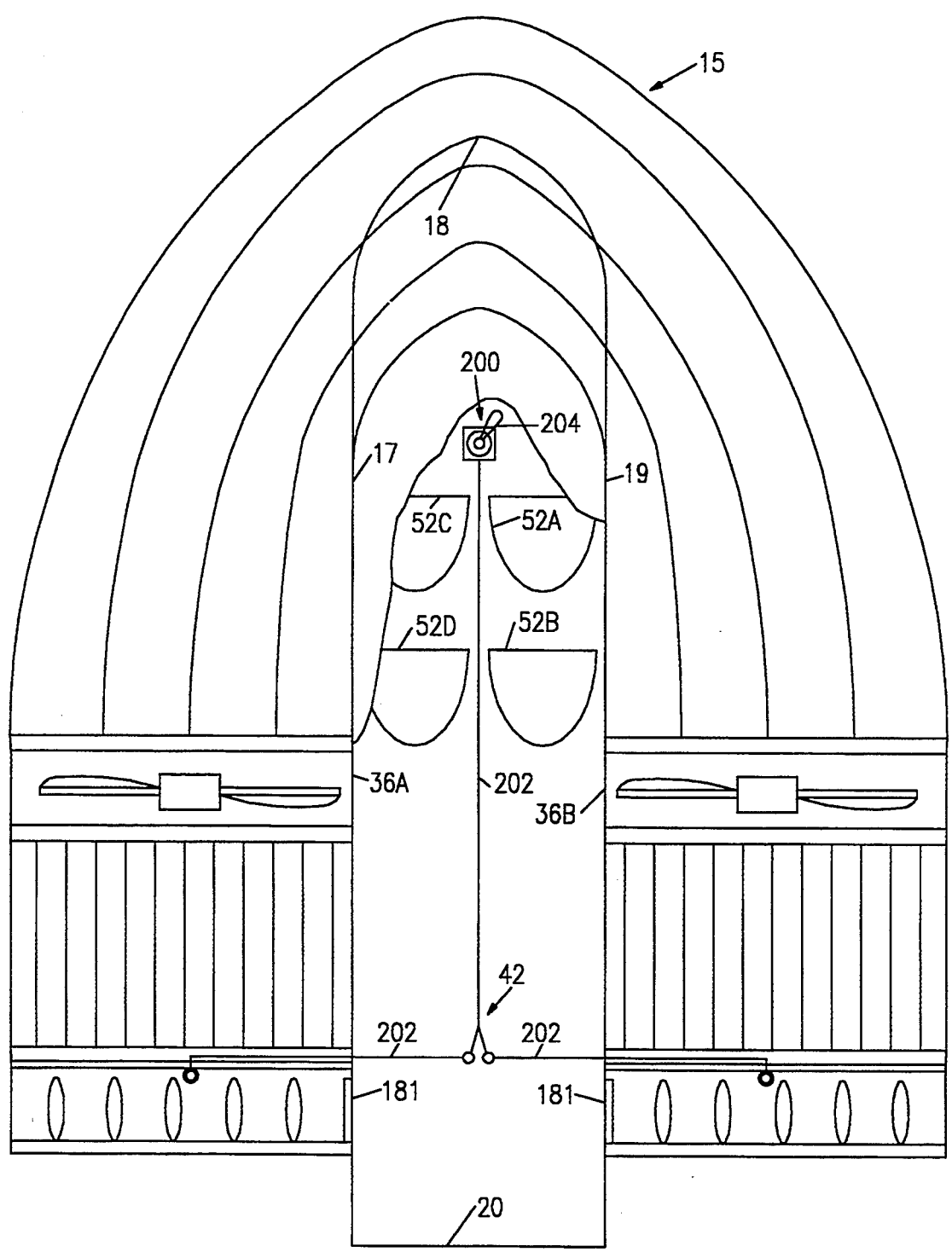
FIG. 3 is a top plan view, partially broken away, of the aircraft of FIG. 1, showing the interior of the hollow body and the steering mechanism connected to the deflectors.

The mutually opposed end portions 190 of the first vanes 184 and the mutually opposed end portions 192 of the second vanes 186, are movably attached to the frame 180 by joints, such as for example, ball joints 194. The ball joints 194 allow the first vanes to be oriented to deflect the air flow 38 thrust rearwards by the engines 36 in an upward or downward direction, and the second vanes 186 to be oriented to deflect the air flow 38 thrust rearwards by the engines 36 in a port or starboard direction to steer the aircraft. A steering mechanism 42 can comprise a steering means 200 connected by linkages 202 to the first vanes 184 and second vanes 186. The steering mechanism 42 allows steering of the aircraft by controlling the orientation of the first vanes 184 and the second vanes 186. The steering means 200 can comprise a joystick 204 attached to a linkage 202 as shown in FIG. 3.

Preferably the first vanes 184 are aerofoil-shaped so that the air flow 38 over the surfaces of these vanes provides additional lift to the aircraft 14. Preferably, the second vanes 186 are aerodynamically shaped to reduce the drag created by the airflow 38 over the surfaces of the second vanes 186.

Preferably, the connectors 206 interconnect the first vanes 184 to the second vanes 186, thereby transmitting the force 208 from the first vanes to the second vanes 186 and thereby transmitting the force 210 from the second vanes 186 to the first vanes 184, so that movement of a single vane in an upward, downward, port or starboard direction results in the simultaneous movement of all the vanes in the same direction.

Preferably, the connectors 206 comprise pins 212 with two mutually opposed ends 214, the pins 212 being inserted into holes 216 in the second vanes 186. Each hole 216 is lined with a pliant material 218 that allows some flexibility in movement of the pin 212 within the hole 216. The pliant material 218 can be a polymeric material such as rubber or plastic. The pins 212 are movably attached at their mutually opposed ends 214 to the sides 218 of the corresponding opening 193 in the corresponding first vane 184. This arrangement allows the steering linkage 202 to be connected to a single first vane 184 or to a single second vane 186, such that movement of that single vane in an upward, downward, port or starboard direction results in the simultaneous movement of all the vanes in the same direction.

Preferably, honeycomb structures 44 are mounted between the engines 36 and the deflectors 40. Each honeycomb structure 44 comprises a frame 220 enclosing a plurality of elongated, hollow channels 222, arranged substantially parallel to each other and with their walls 224 attached to one another. Preferably the channels 222 have a hexagonal crossection. The honeycomb structures 44 cause the air flow 38 thrust rearward by the engines 36 to be directed as a smooth laminar flow of air into the deflectors 40. It is believed that a smooth laminar flow of air directed downwards by the deflectors 40 provides more upward force on the aircraft 14.

Although the present invention has been described in considerable detail with regard to the preferred version thereof, other versions are possible. Therefore, the appended claims should not be limited to the description of the preferred versions contained herein.

What is claimed is:

1. An aircraft comprising:
   (a) a hollow elongated body having port, front, starboard, rear and bottom portions;
   (b) a plurality of wings wherein each wing has an inward edge, an outward edge and a rearward portion, and wherein the inward edge is attached to the body, the outward edge projects outwardly from the body, and substantially forms an half ellipse shape, and the rearward portion extends towards the rear of the body, and wherein each wing traverses substantially the entire length of the port, front and starboard portions of the body, the wings being substantially parallel to each other and attached to the body in a vertically stacked array, wherein a plurality of assemblies are mounted between the vertically stacked wings close to their outward edges, the assemblies being mounted substantially perpendicular to the surface of the wings, and substantially parallel to the hollow body;
   (c) engines attached toward the rear of the body for propelling the aircraft forward by thrusting air rearwards, wherein the engines are fan engines, the diameter of the engines being substantially equal to the maximum width of the wings, the engines being mounted behind the wings, with atleast one engine on each side of the hollow body;
   (d) honeycomb structures mounted behind each engine, running parallel to the hollow body, guiding the rearward air to a deflector assembly mounted on the hollow body behind the honeycomb structures;
   (e) a steering mechanism for adjusting the orientation of deflectors in the deflector assembly: (i) in a downward direction to provide an upward lifting force on the aircraft, or (ii) in an upward direction to provide a downward force on the aircraft, or (iii) in a port or starboard direction to steer the aircraft; and
   (f) landing gear attached to the bottom of the hollow body.

2. The aircraft of claim 1, wherein the wings comprise:
   (a) an aerofoil-shaped flexible housing;
   (b) a plurality of first and second, U-shaped channels arranged within the housing in mutually opposed, spaced apart pairs conforming to the shape of the housing; and
   (c) a plurality of resilient structures between the pairs of channels, wherein the resilient structures can bend and absorb force like a spring.

3. The aircraft of claim 2, wherein the resilient structures comprise:
   (a) a head attached to the first channel; and
   (b) a tail extending toward but not fixedly connected to the second channel, the tail having a curved portion sufficiently resilient so that when the curved portion is forced against the second channel, it can bend and absorb force like a spring and then return back to its normal position thereby absorbing shock.

4. The aircraft of claim 2, wherein the wings further comprise sub-assemblies for maintaining the relative positions of the first and second channels during bending of the resilient structures by an impacting force and afterward during release of the impacting force.

5. The aircraft of claim 4, wherein the sub-assemblies comprise:
   (a) a hollow cylinder attached to one of the channels, the cylinder having an open end with an inwardly extending lip projecting toward the other channel; and
   (b) a rod attached to said other channel, and sized to fit into the open end of the cylinder, wherein at least a portion of the rod extends into the cylinder, and wherein the portion of the rod extending into the cylinder bears a restrictor sized larger than the open end of the cylinder, so that the rod cannot completely exit the cylinder, and whereby the application of an impacting force on either of the channels pushes the rod further into the cylinder, and release of the force returns the rod to its original position, so that the rod and cylinder maintain the relative positions of the channels, during the application and release of the force.

6. The aircraft of claim 1, wherein the landing gear comprises:
 (a) a shock-absorbing suspension assembly having first and second ends, the first end movably attached to the base;
 (b) the suspension assembly comprises: (i) an aerodynamic-shaped flexible housing; (ii) a plurality of first and second, U-shaped channels arranged within the housing in mutually opposed, spaced apart pairs conforming to the shape of the housing; and (iii) a plurality of resilient structures between the pairs of channels, wherein the resilient structures can bend and absorb force like a spring;
 (c) the resilient structures comprise: (i) a head attached to the first channel; and (ii) a tail extending toward but not fixedly connected to the second channel, the tail having a curved portion sufficiently resilient so that when the curved portion is forced against the second channel, it can bend and absorb force like a spring and then return back to its normal position thereby absorbing shock.

7. The shock-absorbing suspension assembly of claim 6, further comprising sub-assemblies for maintaining the relative positions of the first and second channels during bending of the resilient structures by an impacting force and afterward during release of the impacting force, wherein the sub-assemblies comprise:
 (a) a hollow cylinder attached to one of the channels, the cylinder having an open end with an inwardly extending lip projecting towards the other channel; and
 (b) a rod attached to said other channel, and sized to fit into the open end of the cylinder, wherein atleast a portion of the rod extends into the cylinder, and wherein the portion of the rod extending into the cylinder bears a restrictor sized larger than the open end of the cylinder, so that the rod cannot completely exit the cylinder, and whereby the application of an impacting force on either of the channels pushes the rod further into the cylinder, and release of the force returns the rod to its original position, so that the rod and cylinder maintain the relative positions of the channels, during the application and release of the force.

8. The aircraft of claim 1, wherein each honeycomb structure comprising:
 (a) a frame; and
 (b) a plurality of substantially parallel, elongated, hollow cylinders, the walls of the cylinders being joined to one another to form a honeycomb structure which causes the air thrust rearward by the engines to be directed as a smooth and laminar flow of air after passage through the cylinders.

9. The aircraft of claim 9, wherein each cylinder has an external wall that is hexagonal in cross-section.

10. The aircraft of claim 1, wherein the deflectors comprise:
 (a) a frame;
 (b) a grid of first and second vanes capable of deflecting air, wherein the first and second vanes each have a body and two mutually opposed end portions;
 (c) a plurality of spaced apart openings in the body of the first vanes, the openings sized to fit the second vanes, wherein the second vanes are arranged substantially perpendicular to the first vanes, with the body of the second vanes fitting into the openings in the first vanes;
 (d) means to movable attach the mutually opposed end portions of the vanes to the frame; and
 (e) connectors interconnecting the first and second vanes, wherein the connectors transmit forces between the vanes, so that the movement of a single vane in an upward, downward, port or starboard direction results in the simultaneous movement of all the vanes in the same direction.

11. The aircraft of claim 10, wherein the first vanes are shaped in the form of an aerofoil, so that airflow over the surfaces of the vanes can provide additional lift to an aircraft.

12. The aircraft of claim 10, wherein the second vanes are aerodynamically shaped to reduce the drag created by airflow over the surfaces of the second vanes.

13. The aircraft of claim 10, wherein the connectors comprise:
 (a) pins with two mutually opposed ends; and
 (b) a plurality of holes lined with pliant material in the body of each second vane, wherein the pins are inserted into the holes of the second vanes and attached at their mutually opposed ends to the openings in the corresponding first vanes, whereby the pins transmit force applied on the vanes, so that the movement of a single vane in an upward, downward, port or starboard direction results in the simultaneous movement of all the vanes in the same direction.

14. A shock absorbing assembly comprising:
 (a) an aerodynamic-shaped flexible housing;
 (b) a plurality of first and second, U-shaped channels arranged within the housing in mutually opposed, spaced apart pairs conforming to the shape of the housing;
 (c) a plurality of resilient structures between the pairs of channels, wherein the resilient structures bend and absorb force like a spring, wherein the resilient structures comprise:
  (i) a head attached to the first channel; and
  (ii) a tail extending toward but not fixedly connected to the second channel, the tail having a curved portion sufficiently resilient so that when the curved portion is forced against the second channel, it can bend and then return back to its normal position thereby absorbing shock like a spring.

15. The shock-absorbing assembly of claim 14, further comprising sub-assemblies for maintaining the relative positions of the first and second channels during bending of the resilient structures by an impacting force and afterward during release of the impacting force, wherein the sub-assemblies comprise:
 (a) a hollow cylinder attached to one of the channels, the cylinder having an open end with an inwardly extending lip projecting toward the other channel; and
 (b) a rod attached to said other channel, and sized to fit into the open end of the cylinder, wherein atleast a portion of the rod extends into the cylinder, and wherein the portion of the rod extending into the cylinder bears a restrictor sized larger than the open end of the cylinder, so that the rod cannot completely exit the cylinder, and whereby the application of an impacting force on either of the channels pushes the rod further into the cylinder, and release of the force returns the rod to its original position, so that the rod and cylinder maintain the relative positions of the channels, during the application and release of the force.

16. A deflector assembly suitable for use on an aircraft comprising:
   (a) a frame;
   (b) a grid of first and second vanes capable of deflecting air, wherein the first and second vanes each having a body and two mutually opposed end portions;
   (c) a plurality of spaced-apart openings in the body of the first vanes, the openings sized to fit the second vanes, wherein the second vanes are arranged substantially perpendicular to the first vanes, with the body of the second vanes fitting into the openings in the first vanes;
   (d) means to movably attach the mutually opposed end portions of the vanes to the frame;
   (e) connectors interconnecting the first and second vanes, wherein the connectors transmit forces between the vanes, so that the movement of a single vane in an upward, downward, port or starboard direction results in the simultaneous movement of all the vanes in the same direction;
   (f) a steering mechanism connected to one of the vanes, to allow control of the orientation of the vanes so that the first vanes can be oriented to deflect air thrust rearward by the engines in an upward or downward direction, so that second vanes can be oriented to deflect air thrust rearward by the engines in a port or starboard direction, and so that the first and second vanes can be oriented to deflect air thrust rearward by the engines in a combination of upward/downward and port/starboard direction; and
   (g) means for mounting the frame on an aircraft.

17. The deflectors of claim 16, wherein the first vanes are shaped in the form of an aerofoil, so that airflow over the surfaces of the vanes can provide additional lift to an aircraft.

18. The deflectors of claim 16, wherein the second vanes are aerodynamically shaped to reduce the drag created by airflow over the surfaces of the second vanes.

19. The deflectors of claim 16, wherein the connectors comprise:
   (a) pins with two mutually opposed ends; and
   (b) a plurality of holes lined with pliant material in the body of each second vane, wherein the pins are inserted into the holes of the second vanes and attached at their mutually opposed ends to the openings in the corresponding first vanes, whereby the pins transmit force applied on the vanes, so that the movement of a single vane in an upward, downward, port or starboard direction results in the simultaneous movement of all the vanes in the same direction.

* * * * *